(12) United States Patent
Waldecker

(10) Patent No.: US 9,595,720 B2
(45) Date of Patent: Mar. 14, 2017

(54) ELECTRODE WITH CATALYST SEGMENTATION

(71) Applicant: FORD GLOBAL TECHNOLOGIES, LLC, Dearborn, MI (US)

(72) Inventor: James Waldecker, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 13/827,284

(22) Filed: Mar. 14, 2013

(65) Prior Publication Data

US 2014/0272669 A1    Sep. 18, 2014

(51) Int. Cl.
| | |
|---|---|
| H01M 4/86 | (2006.01) |
| H01M 4/88 | (2006.01) |
| H01M 8/04 | (2016.01) |
| H01M 8/10 | (2016.01) |

(52) U.S. Cl.
CPC ...... *H01M 4/86* (2013.01); *H01M 2008/1095* (2013.01); *Y02E 60/50* (2013.01)

(58) Field of Classification Search
CPC .................................................... H01M 4/86
USPC ........................................ 429/513, 535, 523
See application file for complete search history.

(56) References Cited

U.S. PATENT DOCUMENTS

| | | | |
|---|---|---|---|
| 7,927,752 B2 | 4/2011 | Miller et al. | |
| 2003/0044672 A1* | 3/2003 | Fukumoto et al. | ............ 429/40 |
| 2008/0206616 A1* | 8/2008 | Atanassova | ............ C09D 11/30 |
| | | | 429/479 |
| 2010/0047668 A1 | 2/2010 | Steinbach et al. | |
| 2010/0062307 A1* | 3/2010 | Ueda et al. | ...................... 429/30 |
| 2011/0269057 A1* | 11/2011 | Haas et al. | ................... 429/482 |
| 2012/0003563 A1 | 1/2012 | Cai et al. | |

FOREIGN PATENT DOCUMENTS

WO    2007099911 A1    2/2007

OTHER PUBLICATIONS

Buazar, F., et al., "Durability of PT/MWCNT Nanocatalyst in High Temperature H3PO4/PBI PEMFC", NSTI—Nanotech pp. 387-390, vol. 1, 2010.

\* cited by examiner

*Primary Examiner* — Sean P Cullen
(74) *Attorney, Agent, or Firm* — Damian Porcari; Brooks Kushman P.C.

(57) ABSTRACT

A fuel cell assembly includes an anode with a catalyst layer and a gas inlet end, and a cathode with a catalyst layer and a gas inlet end. The assembly comprises a catalyst layer including a first and second set of catalyst segment pairs spaced apart respectively with first and second distances, a first ratio of an average segment width of the first set of catalyst segment pairs relative to the first distance being different from a second ratio of an average segment width of the second set of catalyst segment pairs relative to the second distance.

28 Claims, 6 Drawing Sheets

ELECTRODE WITH CATALYST SEGMENTATION

TECHNICAL FIELD

The present invention relates to a fuel cell assembly designed to enhance durability through catalyst segmentation and a method of making the same.

BACKGROUND

Cost and durability can be barriers to the wide-spread use of hydrogen fuel cell vehicles. Fuel cell stack durability may in turn depend greatly on the robustness of polymer electrolyte membrane fuel cell (PEMFC) catalyst layers, particularly in response to stressors such as startup/shutdown operation and idle operation. Among other things, startup/shutdown degradation may limit fuel cell stack life and hence increase in stack cost.

SUMMARY

In an embodiment, a fuel cell assembly includes an anode with a catalyst layer and a gas inlet end, and a cathode with a catalyst layer and a gas inlet end. The assembly comprises a catalyst layer including a first and second set of catalyst segment pairs spaced apart respectively with first and second distances, a first ratio of an average segment width of the first set of catalyst segment pairs relative to the first distance being different from a second ratio of an average segment width of the second set of catalyst segment pairs relative to the second distance.

In another embodiment, a method of improving the durability of a fuel cell includes having an anode and a cathode, with an inlet and an outlet, comprising the step of reducing the in-plane transfer of electrons within the anode by providing a catalyst layer with predefined segments.

In yet another embodiment, a method of improving a hydrogen fuel cell includes having an anode and a cathode, comprising the step of: creating a predefined hydrogen/air front on the cathode to enable lower half-cell potentials and higher surface area.

DETAILED DESCRIPTION

Figure 1A:
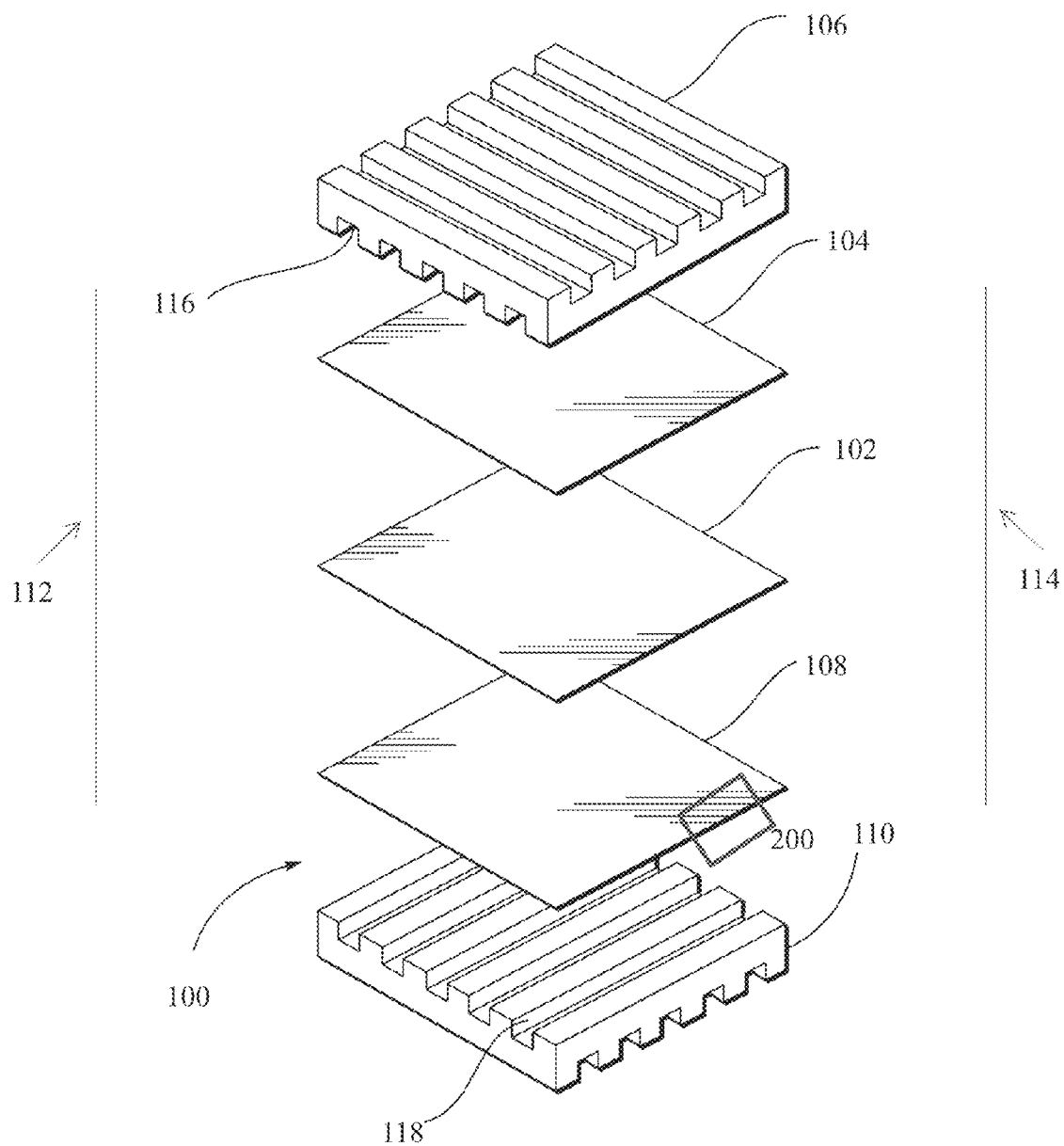
FIG. 1A illustratively depicts a perspective view of a fuel cell according to one or more embodiments of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Reference will now be made in detail to embodiments and methods of the present invention which constitute the best modes of practicing the invention presently known to the inventors. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary, percent (%), "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application in their entirety to more fully describe the state of the art to which this invention pertains. Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The term "segmentation" or "segments" refers to discrete portions of a catalyst layer that are created through one or more interruptions of or breaks in the catalyst layer, resulting in a catalyst layer that is discontinuous through a portion and/or the entire catalyst layer—creating one or more gaps in the catalyst layer.

The term "polymer electrolyte membrane fuel cell" or "proton electrolyte membrane fuel cell" is used interchangeably with the abbreviation "PEMFC" and refers to a fuel cell with a polymer electrolyte membrane that transforms the chemical energy liberated during the electrochemical reaction of hydrogen and oxygen to electrical energy.

The term "membrane electrode assembly" is used interchangeably with the abbreviation "MEA."

Fuel Cell Assembly Design

With the increasing interest in efficient and clean energy technologies, fuel cells and in particular polymer electrolyte membrane fuel cells (PEMFC) have attracted much attention for applications in transportation, stationary, portable and micro-power systems.

Per the general functionality of a PEMFC, a stream of hydrogen is delivered to the anode side of the membrane electrode assembly (MEA). At the anode side it is catalytically split into protons and electrons. This oxidation half-cell reaction is represented as follows:

At the Anode:

$$H_2 \rightarrow 2H^+ + 2e^- \quad E° = 0V \qquad (1)$$

The newly formed protons permeate through the polymer electrolyte membrane to the cathode side. The electrons travel along an external load circuit to the cathode side of the MEA, thus creating the current output of the fuel cell. Meanwhile, a stream of oxygen is delivered to the cathode side of the MEA. At the cathode side oxygen molecules react with the protons permeating through the polymer electrolyte membrane and the electrons arriving through the external circuit to form water molecules. This reduction half-cell reaction is represented as follows:

At the Cathode:

$$1/2 O_2 + 2H^+ + 2e^- \rightarrow H_2O \quad E° = 1.229V \qquad (2)$$

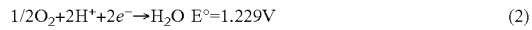

Overall Reaction:

$$H_2 + 1/2 O_2 \rightarrow H_2O$$

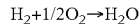

The reversible reaction is expressed in the above equation and shows the reincorporation of the hydrogen protons and electrons together with the oxygen molecule and the formation of one water molecule.

As such, the durability of the fuel cell is dependent on the membrane conducting hydrogen ions (protons) but not electrons as this would in effect "short circuit" the fuel cell. The membrane must also not allow either gas to pass to the other side of the cell, a problem known as gas crossover. Finally, the membrane must be resistant to the reducing environment at the cathode as well as the harsh oxidative environment at the anode.

Fuel cell durability is in particular compromised due to the irregularities that arise during startup and shutdown. More specifically, during startup of the fuel cell, the anode flow field is substantially free of hydrogen. As such, there is an insufficient supply of hydrogen in the anode flow during the transitional startup period to provide the required electrical output. Likewise, during the shutdown period there is a similar transitional period when the anode flow field is purged of hydrogen and may not have adequate hydrogen to provide the desired electrical output. During these transitional periods, in the absence of hydrogen, the fuel cell will oxidize the catalyst disposed on the electrodes. This oxidation degrades the catalyst and reduces the ability of the fuel cell to produce an electrical current. The cumulative degradation of the catalyst during startup and shutdown eventually reduces the electrical output to such a level where the fuel cell stack must be rebuilt or replaced.

As described by Tang et al, J. Power Sources (2006), incorporated herein by reference, there is a "loop current" associated with startup/shutdown degradation. In the case of startup, as hydrogen is introduced to an air-occupied anode, a hydrogen/air front develops on the anode. At this stage, fuel cell reactions may proceed on the hydrogen side of the hydrogen-air front and drive the electrolytic reactions on the air side of the hydrogen-air front. These reactions may include oxygen reduction on the anode, oxygen evolution ($O_2 + 4H^+ + 4e^- \rightarrow 2H_2O$) and degradation reactions such as corrosion of the carbon support ($C + 2H_2O \rightarrow CO_2 + 4H^+ + 4e^-$) as well as reactions that contribute to the dissolution of the catalyst.

Several mitigation strategies have been proposed in an attempt to reduce catalyst degradation associated with the startup/shutdown "loop current". One approach is carried out via the use of an anode catalyst that can facilitate the hydrogen oxidation reaction (HOR), but not the oxygen reduction reaction (ORR). However, while catalysts are still under development for defeating oxygen reduction at the anode, no commercial product presently exists.

Another approach is to decrease the catalyst loading coupled with an aim to achieve lower stack cost. As the catalyst loading decreases, however, catalyst dissolution may be more likely to occur, leading to quicker degradation. At higher catalyst loadings, mass transport limitations dominate, which means there is a cushion for losing the catalyst loading without immediately experiencing power degradation. Lower catalyst loadings are often enabled by improved utilization of the catalyst, which makes preservation of catalyst loadings throughout the lifetime of the stack even more important.

Another suggested approach is the use of oxygen depletion to avoid the formation of abrupt hydrogen/air fronts. Oxygen depletion is however limited as it can usually only endure for a short period. Further, oxygen depletion may represent a degradation risk for high activity catalysts, such as Platinum-alloy catalysts, which are prone to dissolution at all fuel cell potentials.

Yet another approach may be carried out via the use of a cathode catalyst that selectively oxidizes water instead of carbon or the catalyst itself. The acceleration of oxygen evolution on the cathode would however be performed with the addition of certain precious metals that will add further cost to the fuel cell stack.

A Durable Fuel Cell Assembly

Disclosed herein, in one or more embodiments is a fuel cell assembly that seeks to reduce or eliminate the in-plane transfer of electrons within the catalyst by segmenting the catalyst, or breaking up the catalyst into predefined segments.

For purposes of illustration, an exemplary fuel cell 100 is schematically depicted in FIG. 1A. The fuel cell 100 includes a pair of bi-polar plates 106, 110 having grooves 116, 118 formed at a predetermined interval on both sides of each of the bi-polar plates 106, 110. The fuel cell 100 also includes an ionic exchange membrane 102 disposed between the bi-polar plates 106, 110, a first electrode such as an air electrode or a cathode 104 disposed between the ionic exchange membrane 102, 110 and the bi-polar plate 110, and a second electrode such as a fuel electrode or an anode 108 disposed between the ionic exchange membrane 102 and the bi-polar plate 106.

The anode 108, the negative post of the fuel cell, conducts the electrons that are freed from the hydrogen molecules so that they can be used in an external circuit.

The cathode 104, the positive post of the fuel cell, distributes oxygen to the surface of the catalyst. It also conducts the electrons back from the external circuit to the catalyst, where they can recombine with the hydrogen ions and oxygen to form water.

Figure 1B:
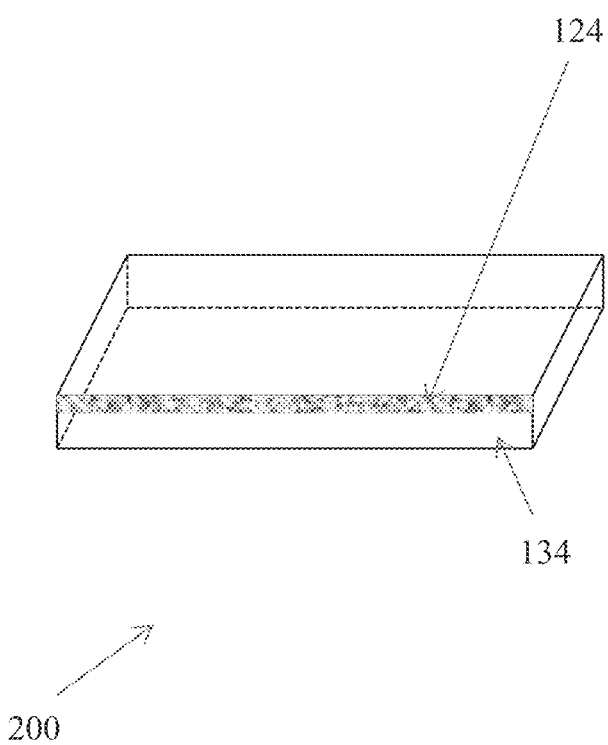
FIG. 1B illustratively depicts a perspective view of an anode referenced in FIG. 1A.

A typical fuel cell further includes a catalyst to expedite the reaction of oxygen and hydrogen, as illustrated in an embodiment shown in FIG. 1B. In operation, hydrogen gas ($H_2$) enters the fuel cell 100 on the anode side 108. When an $H_2$ molecule comes in contact with the catalyst, it splits into two $H^+$ ions and two electrons (e). The electrons are conducted through the anode 108, where they make their way through the external circuit (not shown) and return to the cathode side 104 of the fuel cell 100.

Meanwhile, on the cathode side 104 of the fuel cell 100, oxygen gas ($O_2$) passes through the catalyst, where it forms two oxygen atoms. Each of these atoms has a strong negative charge. This negative charge attracts the two $H^+$ ions through the ionic exchange membrane 102, where they combine with an oxygen atom and two of the electrons from the external circuit to form a water molecule ($H_2O$).

The bi-polar plates 106 and 110 are for electrically connecting the anode 108 and the cathode 104, and preventing fuel and air (an oxidizer) from being mixed. The grooves 116 and 118 are used as fuel and air passages in the cells connected end to end.

As described above, in view of the issues with fuel cell durability and cost, in particular due to start up and shut down irregularities, disclosed herein are embodiments that include a segmented catalyst layer to reduce or eliminate in-plane transfer of electrons. While not intended to be a limiting explanation, catalyst segmentation reduces contact between discrete segments, which then reduces or in some instances eliminates in-plane transfer of electrons which helps mitigate startup/shut down degradation.

FIG. 1B depicts an enlarged perspective view of a section 200 of the anode 108 referenced in FIG. 1A. In this embodiment, the anode 108 may include a segmented catalyst layer 124 supported on a substrate 134 with the segmented catalyst layer 124 facing the membrane 102.

As disclosed herein, catalyst segmentation may be employed on either or both the anode and cathode to improve fuel cell durability. As anode hydrogen air-fronts lead to reactions that contribute to the dissolution of the catalyst, in a preferred embodiment, the anode catalyst layer is segmented. In an alternate embodiment, for example when the "loop current" effect is not reduced sufficiently through the use of anode catalyst segmentation, a designer may include catalyst segmentation on the cathode catalyst layer as well, weighing the tradeoff between reduction of potential across the fuel cell with the increased cost due to increased stack size.

Where cost is a concern, an embodiment is disclosed where the catalyst segmentation is limited to the anode catalyst. For such embodiments, because the segmentation is on the anode, hydrogen may have an opportunity to crossover to the cathode where oxygen is being consumed. This may create a small hydrogen-air front on the cathode catalyst. Notably, cathode hydrogen-air fronts are more benign than anode hydrogen-air fronts, since fronts on the cathode will give rise to a proton pumping electrochemical couple that induces lower half-cell potentials, not the higher potentials associated with catalyst dissolution, corrosion or passivation. Moreover, lower half-cell potentials on the cathode may enable higher surface area, and hence more active catalyst supports. This can help decrease either catalyst loading or stack active area, resulting in a lower cost stack.

The extent of catalyst segmentation may be adjusted in view of relevant applications and/or operating considerations. For instance, the extent of catalyst segmentation may be balanced to reduce the likelihood of accelerated mechanical failure. As anode catalysts usually range in thickness from 5 to 12 microns, catalyst segmentation will not have a significant impact on the membrane mechanical integrity. This relatively small thickness would not readily permit any drastic shrinkage or expansion conversions under wet and/or dry conditions.

In a preferred embodiment, the gap or distance between the two adjacent catalyst systems is predefined to a width that avoids "pinching" the membrane. Likewise, in a preferred embodiment, any hygroscopic (absorption of water) ratcheting is minimized or avoided. Pinching occurs in the course of hygroscopic ratcheting, wherein the membrane expands and contracts in the course of wet and dry conditions respectively. The defects in an adjacent layer can eventually create stress points in the membrane, pinching the membrane as it expands under wet conditions. With the material fatigue that comes with wet/dry cycling, these stress points can turn into mechanical failure in the membrane that can then propagate and cause membrane failure. To reduce the possibility of catalyst pinching, the average distance between two adjacent catalyst segments is preferably no less than 0.2 mm.

Manufacturing tolerances are also relevant to determining the preferred gap or distance between two adjacent catalyst segment pairs. In one embodiment, when considering available manufacturing tolerances, the average distance between two adjacent catalyst segment pairs is preferably no less than 0.2 mm and no greater than 1-2 mm. Notably, the greater the distance between catalyst segment pairs the large the area of the stack cell and hence increased cost.

Figure 2A:
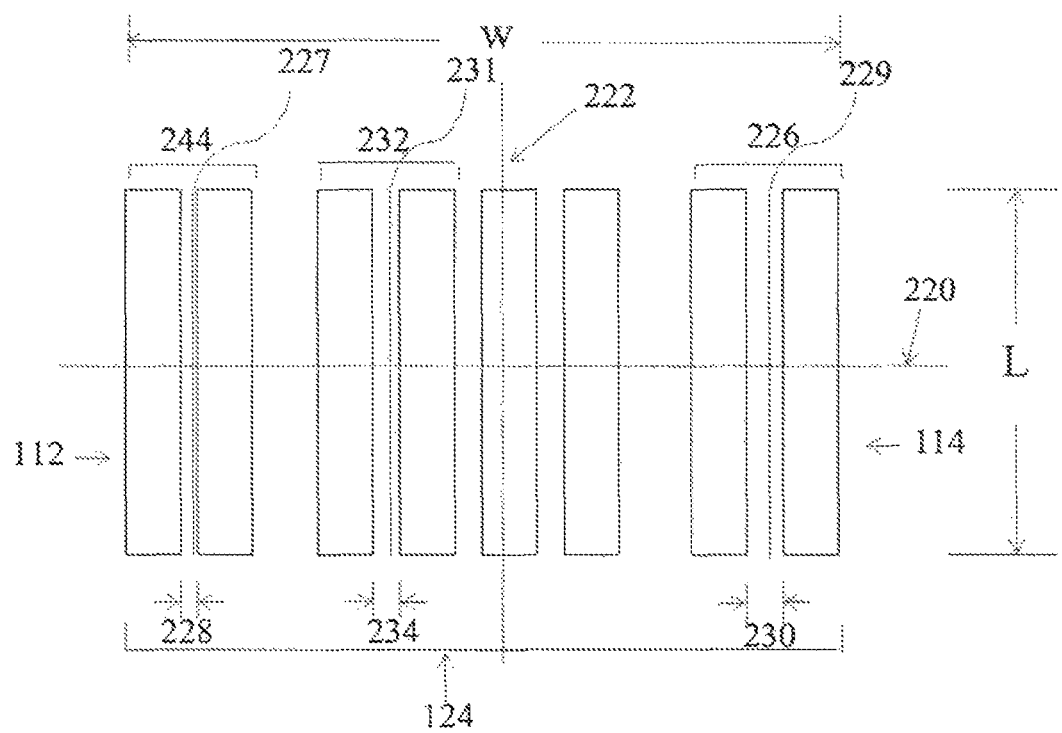
FIG. 2A illustratively depicts a top view of a segmented catalyst layer of the anode referenced in FIG. 1B.

FIG. 2A depicts a top view of the segmented catalyst layer 124 embodiment referenced in FIG. 1B. In that embodiment, the segmented catalyst layer 124 is depicted to include a longitudinal axis 220 and a transverse axis 222 perpendicular to the longitudinal axis 220. The segmented catalyst layer 124 may include one or more pairs of first catalyst segments 224 positioned closer to the inlet end and spaced apart from each other with a first distance 228 along the longitudinal axis 220 and one or more pairs of second catalyst segments 226 positioned closer to the outlet end and spaced apart from each other with a second distance 230 along the longitudinal axis 220. Additional catalyst segments may be positioned between the first and second pairs of catalyst segments 224, 226 as needed to satisfy fuel cell catalytic activities.

In one embodiment, when electron conduction through the catalyst plane is eliminated or sufficiently reduced, the first distance 228 may be substantially the same as the second distance 230 such that the first pair of catalyst segments 224 and the second pair of catalyst segments 226 are substantially uniformly positioned relative to each other.

Figure 2B:
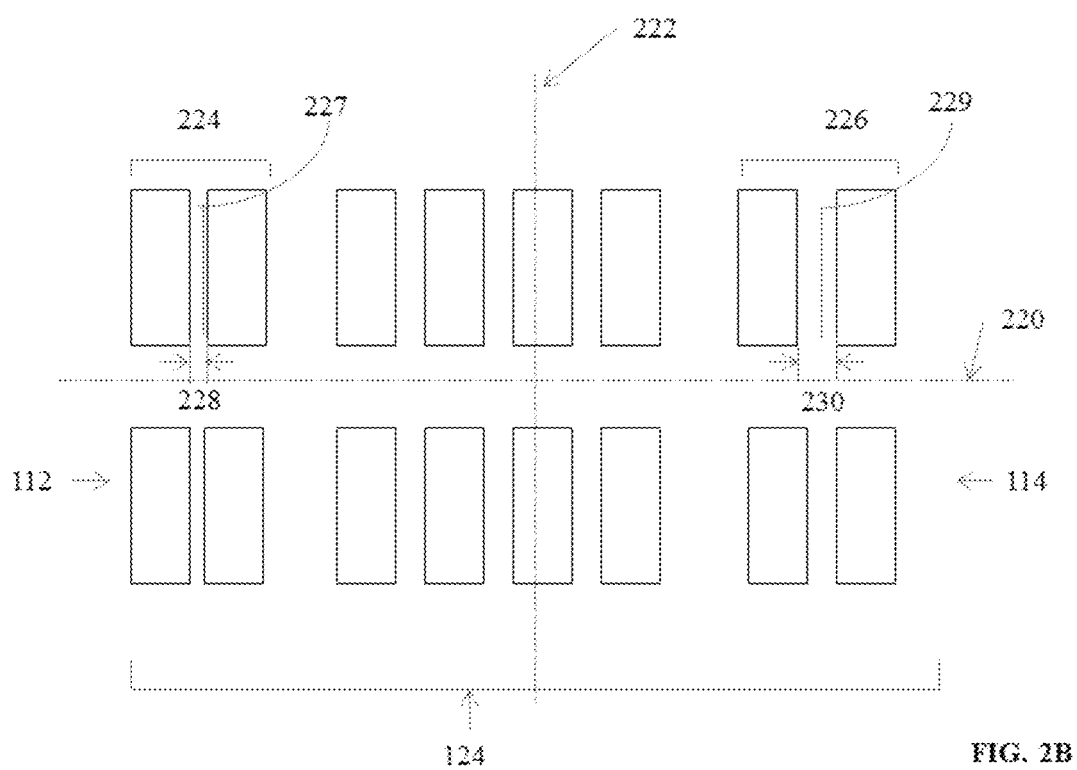
FIG. 2B illustratively depicts an alternative view of the segmented catalyst layer referenced in FIG. 2A.
Figure 2C:
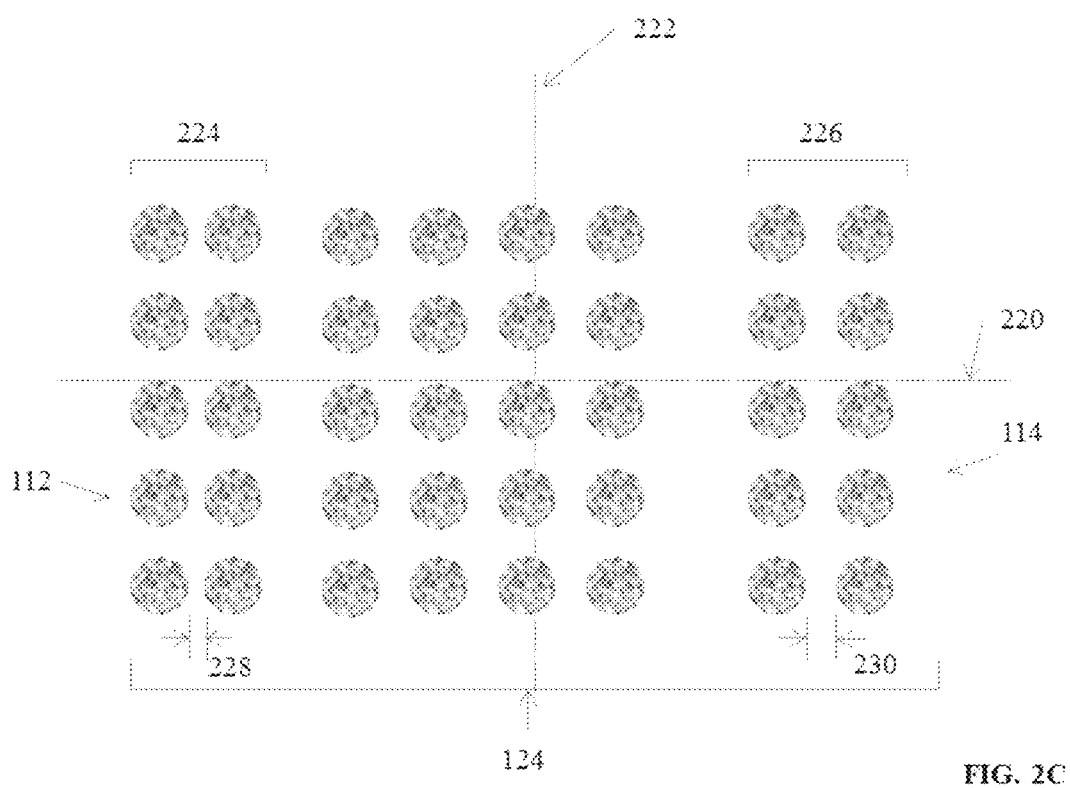
FIG. 2C illustratively depicts another alternatively view of the segmented catalyst layer referenced in FIG. 2A.

In another variation, the first distance 228 is different than the second distance 230. In one version of this variation, as depicted in FIGS. 2B and 2C, more segmentation is present towards the inlet end 112 than at the outlet end 114, resulting in segment pairs having varying distances, wherein the distance between segment pairs generally increases from the inlet end to the outlet end, as depicted in FIG. 2A as first, second and third distances 228, 230, and 234. For this variation, it is believed that hydrogen-air fronts would be more dramatic at the inlet end than at the outlet end. Hydrogen would presumably have had greater residence time over which to diffuse through the air by the time it reaches the outlet, reducing the need for segmentation at the outlet end. In a preferred embodiment, the first, second and third distances 228, 230, and 234 are each greater than 200 micrometers, 250 micrometers or 300 micrometers. The total width "W" of the catalyst layer 124 and the total number of the catalyst segments will set forth an upper limit of the distances 228, 230 or 234. The total width of the catalyst segments should preferably not be greater than the value of "W".

A first ratio may be defined as the ratio of the first average segment width relative to the first distance 228. A second ratio may be defined as the ratio of the second average segment width relative to the second distance 230. A third ratio may be defined as the ratio of the third average segment width relative to the third distance 234. In certain instances, the third ratio may be greater than the first ratio and smaller than the second ratio. Therefore, the in-plane transfer of electrons traveling from the side of the inlet 112 towards the side of the outlet 114 may experience the greatest segmentation effect at the side of the inlet 112 compared to the rest of its journey towards the outlet 114. This may be beneficial to provide the greatest amount of reduction of the in-plane electron travel at the side of inlet 112 where the need for the reduction may gradually decrease towards the side of the outlet 114. In an embodiment, the first 20% of the anode catalyst layer, closest to the inlet 112, has a ratio of average segment width to distance of 2.5 to 12.5. Likewise, in one embodiment, the 80% of the anode catalyst layer closest to the outlet 114 has a ratio of average segment width to distance of 10-50.

The choice of a ratio of width to distance will depend on the designer's beliefs about the abruptness of the hydrogen/air front. If the front is abrupt, the damage will be more localized and it will travel along with the front as the hydrogen enters the cell. For such abrupt fronts, a wide segment will not sufficiently minimize the risk of degradation. Therefore, for an abrupt front, a low segment/distance ratio is preferred. Conversely, if the front is more spread out due to gas diffusion, the segment/distance ratio can be smaller. Note that the abruptness of the hydrogen/air front can depend on many things, but mostly it depends on the anticipated frequency of air/air starts in the vehicle. There are more air/air starts if the vehicle is allowed to sit for longer periods of time, or if there are no system mitigation strategies to avoid air/air starts. Typically, abrupt hydrogen/air fronts are expected at the inlet end, while diffuse hydrogen air/fronts are expected at the outlet end. As such, in one embodiment, the preferred ratio of width to distance for an abrupt hydrogen air/front is 2.5 to 1.5 and 10 to 50 for a diffuse hydrogen air/front.

In another variation, a first spacing material 227 may be disposed within the first distance 228 and covers a portion of the first distance 228. The first spacing material 227 is preferably less electrically conductive than the material(s) forming the first pair of catalyst segments 224. Per this variation, the first spacing material 227 is preferably between 5-35% less electrically conductive than the material(s) forming the first pair of catalyst segments 224. The first spacing material 227 may form a layer covering a substantial portion of the first distance 228 along the longitudinal axis 220 and/or the transverse axis 222. In relation to the longitudinal axis 220, in one embodiment, the first spacing material 227 is preferably between 0.2-0.5 mm or alternately up to 2 mm (depending on available manufacturing tolerances for the catalyst segment pair distances). By way of example, per one embodiment, if the distance between catalyst segment pairs is 0.2-1 mm, the first spacing material 227 would preferably be between 0.4-0.8 mm, allowing for a gap of at least 0.2 mm gap on either side of the first spacing material and the adjacent catalyst segment pairs. Likewise, in an alternate embodiment, a first spacing material is from 0.4 to 1.8 mm positioned within the first distance of 0.2 to 2 mm.

Per a related variation, a second spacing material 229 may be disposed within the second distance 230 and covers a portion of the second distance 230. The second spacing material 229 may be less electrically conductive than the material(s) forming the second pair of catalyst segments 226. The second spacing material 229 is preferably between 5-35% less electrically conductive than the material(s) forming the second pair of catalyst segments 226. The second spacing material 229 may form a layer covering a substantial portion of the second distance 230 along the longitudinal axis 220 and/or the transverse axis 222. In relation to the width longitudinal axis 220, in one embodiment, the second spacing material 229 is preferably between 0.2-0.5 mm or alternately up to 2 mm (depending on available manufacturing tolerances for the catalyst segment pair distances). By way of example, per one embodiment, if the distance between catalyst segment pairs is 0.2-1 mm, the second spacing material would be sized to allow for a gap of at least 0.2 mm on either side of the second spacing material and the adjacent catalyst segment pairs. Likewise, in an alternate embodiment, the second distance is preferably 0.2 to 2 mm.

The segmented catalyst layer 124 may further include a third pair of catalyst segments 232 spaced apart from each other with a third distance 234. A third spacing material 231 may be disposed within the third distance 234. The third spacing material 231 may be less electrically conductive than the material(s) forming the third pair of catalyst segments 232. In such instances, the third spacing material 231 is preferably between 5%-35% less electrically conductive than the material(s) forming the third pair of catalyst segments 232. The third spacing material 231 may form a layer covering a substantial portion of the third distance 234 along the longitudinal axis 220 and/or the transverse axis 222.

In an alternate embodiment, the third spacing material may be greater in electric conductivity than the first and second spacing materials. With this embodiment, the in-plane transfer of electrons traveling from the side of the inlet 112 towards the side of the outlet 114 may experience the greatest resistance in electric conductivity at the side of the inlet 112 compared to the rest of it journey towards the outlet 114. This may be beneficial to provide the greatest amount of reduction in in-plane electron travel at the side of inlet 112 where the need for the reduction may gradually decrease towards the side of the outlet 114.

The first, second and third spacing materials may each independently include PTFE (polytetrafluoroethylene), PVDF (polyvinylidene fluoride), Nafion (a trademark registered by Dupont) or other perfluorinated sulfonic acids or polymers, other fluorocarbons or combinations thereof.

Referring back to FIG. 2A, all the catalyst segments including the first and second pairs of catalyst segments 224, 226 may have a segment length equal to the length "L" of the segmented catalyst layer 124 along the transverse direction 222. A combined total segment width of all the catalyst segments including the first and second pairs of catalyst segments 224, 226 would be smaller than the width "W" of the segmented catalyst layer 124 along the longitudinal axis 220 due to the segmentation.

Without intending to deviate from the spirit of this invention, some or all of the catalyst segments may have a length smaller than the length "L" of the segmented catalyst layer 124. It is also possible that the catalyst segments may vary in length relative to each other and a resultant array of the catalyst segments may have a non-uniform distribution of segment lengths. For instance, and as depicted in FIG. 2B, two separate arrays of catalyst segments are positioned on a rear portion and a front portion of the segmented catalyst layer 124 along the transverse axis 222. While the catalyst segments are shown to be arranged parallel to each other along the longitudinal axis 220, that is merely one arrangement. All viable arrangements are contemplated.

The catalyst segments including the first and second pairs 224, 226 can further be of any suitable shape and/or size, including the rectangular shape shown. The shapes and the sizes can be chosen based on the particular purpose at hand. For instance, and as depicted in FIG. 2C, the catalyst segments are depicted to be circular in shape. Of course, a combination of sizes and shapes can be mixed and matched to satisfy a particular purpose, such as to match the hydrogen air/front or cell geometry based on where the inlet is located and the location of the active area.

Figure 3:
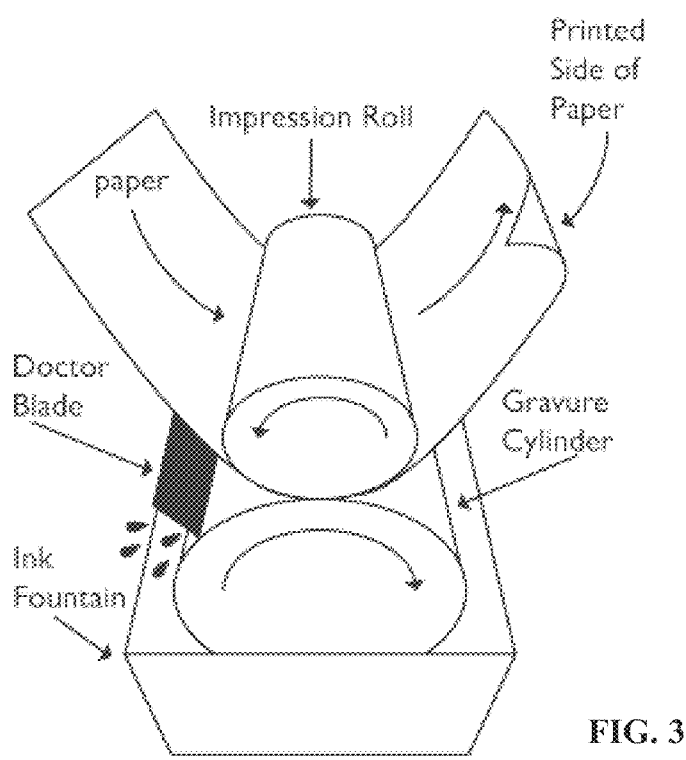
FIG. 3 illustratively depicts a perspective view of a gravure cylinder adaptable for forming the segmented catalyst layer referenced in FIG. 2A.

As a non-limiting example, a gravure cylinder may be used to form the segmented catalyst layer 124 described herein. As illustratively depicted in FIG. 3, a gravure cylinder can be made with impressions that allow for segmentation of the catalyst layer. The catalyst layer is derived from the ink found in the ink fountain and applied to the membrane (which takes the place of the "paper" labeled in the diagram). As the cylinder rolls through the fountain, ink goes into the divot impressions on the side of the cylinder, and the ink above these divots is pushed back into the fountain by the doctor blade. Spaces can be created between divots which then account for the catalyst layer segmentation.

As another non-limiting example, inkjet printing such as piezoelectric drop-on demand inkjet printing may be used to form the segmented catalyst layer. Piezoelectric drop-on demand inkjet printing is already widely used for industrial applications. The one challenge with using the technology is the possibility that an electrically conductive ink would not be amenable to a system that relies upon a piezoelectric material's response to voltage to generate a pressure pulse and control the deposition of ink droplets. However, it is possible that ink constituents (e.g., solvents) could be added that would minimize electrical conductivity, and that such constituents would be volatile enough to be removed from the catalyst layer during further processing (e.g., bonding or fuel cell conditioning).

The employment of the insulating material may be carried out with an inkjet process. The inkjet machine may be provided with two cartridges: one with the catalyst, and one with the insulating material. Using a programmed design for the catalyst layer, the inkjet could then deposit the catalyst in assigned regions to form the catalyst segments, and the insulator in the balance of the regions.

While the best mode for carrying out the invention has been described in detail, those familiar with the art to which this invention relates will recognize various alternative designs and embodiments for practicing the invention as defined by the following claims.

What is claimed is:

1. A fuel cell assembly including an anode and cathode, each comprising:
   a catalyst layer including a plurality of pairs of catalyst segments disposed between an inlet end and an outlet end, a distance separating the segments of each of the pairs increasing from the inlet end to the outlet end.

2. The fuel cell assembly of claim 1, wherein the plurality of pairs of catalyst segments comprises a first pair of catalyst segments and a second pair of catalyst segments, and wherein the distance comprises a first distance separating individual segments of the first pair of catalyst segments and a second distance separating individual segments of the second pair of catalyst segments.

3. The fuel cell assembly of claim 2, wherein at least one of the first and second distances is no less than 200 micrometers.

4. The fuel cell assembly of claim 2, further comprising a third pair of catalyst segments located between the first and second pairs of catalyst segments, a third distance separating individual segments of the third pair of catalyst segments, the third distance being greater than the first distance and smaller than the second distance.

5. The fuel cell assembly of claim 2, further comprising a first spacing material positioned within the first distance and a second spacing material positioned within the second distance, wherein the first spacing material is less electrically conductive than the second spacing material.

6. The fuel cell assembly of claim 2, further comprising a first and second spacing material, each sized to allow for a gap of at least 0.2 mm on either side of the first or second spacing material.

7. The fuel cell assembly of claim 2, further comprising a first and second spacing material positioned between the first and second distances respectively, wherein the first and second spacing materials have a width between 0.2 and 2 mm.

8. The fuel cell assembly of claim 2, further comprising a first spacing material positioned within the first distance and a second spacing material positioned within the second distance wherein the first and second spacing materials are insulating materials selected from the group consisting of PTFE, PVDF, perfluorinated sulfonic acids, perfluorinated polymers, fluorocarbons and combinations thereof.

9. A fuel cell assembly including an anode and a cathode, each comprising:
   a catalyst layer including an inlet end and an outlet end;
   a first set of catalyst segment pairs located at the inlet end and a second set of catalyst segment pairs located at the outlet end, individual segments of the first and second sets of catalyst segment pairs are spaced apart respectively with first and second distances, and
   a first ratio of a first average segment width relative to the first distance being smaller than a second ratio of a second average segment width relative to the second distance.

10. The fuel cell assembly of claim 9, wherein the first average segment width is smaller than the second average segment width.

11. The fuel cell assembly of claim 9, wherein one or both of the first and second average segment width are no less than 100 micrometers.

12. The fuel cell assembly of claim 9, wherein the first ratio is 2.5 to 12.5 and the second ratio is 10 to 50.

13. The fuel cell assembly of claim 9, wherein the first set of catalyst segment pairs is positioned between the inlet end and the second set of catalyst segment pairs, wherein the first distance is smaller than the second distance.

14. The fuel cell assembly of claim 9, further comprising a third set of catalyst segment pairs located between the first and second sets of catalyst segment pairs, individual segments of the third set of catalyst segment pairs being spaced apart with a third distance, the third set of catalyst segment pairs having a third average segment width, a third ratio of the third average segment width relative to the third distance being greater than the first ratio and smaller than the second ratio.

15. The fuel cell assembly of claim 9, further comprising a third set of catalyst segment pairs separated with a third distance and a third spacing material positioned within the third distance, wherein the third spacing material is more electrically conductive than the first and second spacing materials.

16. The fuel cell assembly of claim 15, wherein the third spacing material is an insulating material selected from the group consisting of PTFE, PVDF, perfluorinated polymers, fluorocarbons and combinations thereof.

17. The fuel cell assembly of claim 9, further comprising a first spacing material being positioned within the first distance and a second spacing material being positioned within the second distance.

18. The fuel cell assembly of claim 17, wherein the first spacing material is less electrically conductive than the second spacing material.

19. The fuel cell assembly of claim 17, wherein the first spacing material comprises PTFE, PVDF, perfluorinated polymers, fluorocarbons, or a combination thereof.

20. The fuel cell assembly of claim 17, wherein the first spacing material is less electrically conductive than the first set of catalyst segment pairs.

21. The fuel cell assembly of claim 17 wherein the second spacing material is less electrically conductive than the second set of catalyst segment pairs.

22. A method of improving the durability of a fuel cell having an anode and a cathode, with an inlet and an outlet, comprising the step of:
reducing in-plane transfer of electrons within the anode by providing a catalyst layer for both the anode and cathode with a plurality of pairs of catalyst segments disposed between an inlet end and an outlet end, a distance separating the segments of each of the pairs increasing from the inlet end to the outlet end.

23. The method of claim 22,
wherein the catalyst segments are created using a gravure technique.

24. The method of claim 22,
wherein the catalyst segments are created using inject printing.

25. The method of claim 22, further comprising
a step of depositing a material selected from the group consisting of PTFE, PVDF, perfluorinated sulfonic acids, perfluorinated polymers, fluorocarbons and combinations thereof in between the catalyst segments.

26. The method of claim 22,
wherein a greater number of the catalyst segments are placed in proximity of the inlet end than the outlet end.

27. The method of claim 22, further comprising
a step of minimizing loss of a catalyst active area and mechanical integrity by limiting a number of the catalyst segments.

28. A method of improving a hydrogen fuel cell having an anode and a cathode, comprising the step of:
creating a predefined hydrogen/air front on the cathode to enable lower half-cell potentials and higher surface area,
wherein each anode and cathode comprises a catalyst layer including a plurality of pairs of catalyst segments disposed between an inlet end and an outlet end, a distance separating the segments of each of the pairs increasing from the inlet end to the outlet end.

* * * * *